(12) United States Patent
Bell et al.

(10) Patent No.: US 6,549,619 B1
(45) Date of Patent: Apr. 15, 2003

(54) METHOD FOR SCREENING CALLS

(75) Inventors: Brent V. Bell, Tempe, AZ (US); Peggy S. Schwend, Phoenix, AZ (US); L. Anne Mardick, Overland Park, KS (US)

(73) Assignee: Qwest Communications International Inc., Denver, CO (US)

( * ) Notice: Subject to any disclaimer, the term of this patent is extended or adjusted under 35 U.S.C. 154(b) by 0 days.

(21) Appl. No.: 09/451,882

(22) Filed: Dec. 1, 1999

(51) Int. Cl.[7] .................................................. H04M 3/42
(52) U.S. Cl. ........................... 379/210.02; 379/210.03; 379/142.04
(58) Field of Search ..................... 379/142.04, 142.06, 379/142.08, 210.02, 210.03

(56) References Cited

U.S. PATENT DOCUMENTS 5,757,899 A * 5/1998 Boulware et al. ........... 379/196
5,802,157 A * 9/1998 Clarke et al. ................ 379/196

* cited by examiner

*Primary Examiner*—Creighton Smith
(74) *Attorney, Agent, or Firm*—Brooks & Kushman P.C.

(57) ABSTRACT

Methods for automatically administrating incoming and outgoing call services include, for example, a method for screening calls from a caller to a subscriber intercepts a call and sends the call directly to the subscriber when the caller is on an established privileged caller list. The exemplary method includes establishing the privileged caller list, and holding a call for further processing if the caller is not on the privileged caller list.

18 Claims, 2 Drawing Sheets

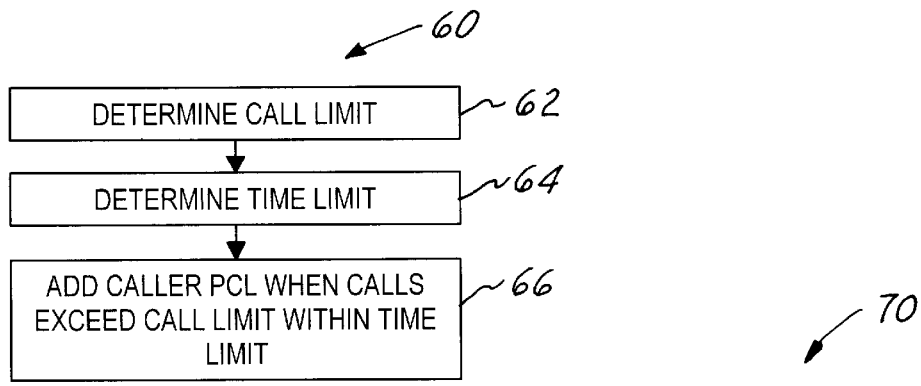
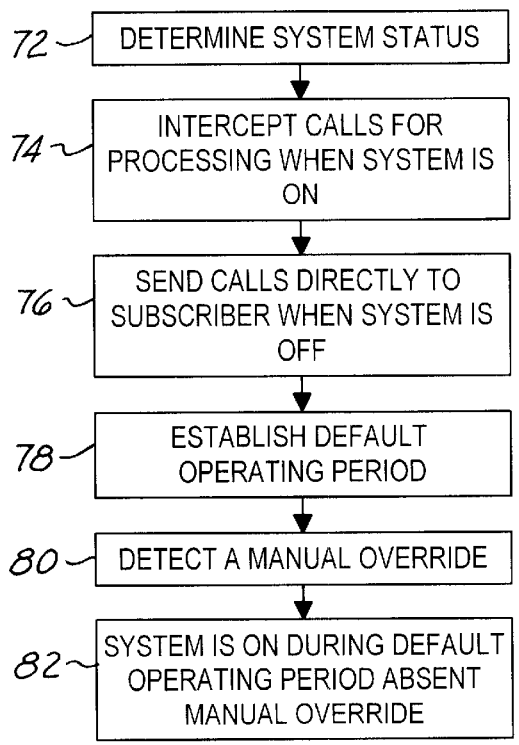
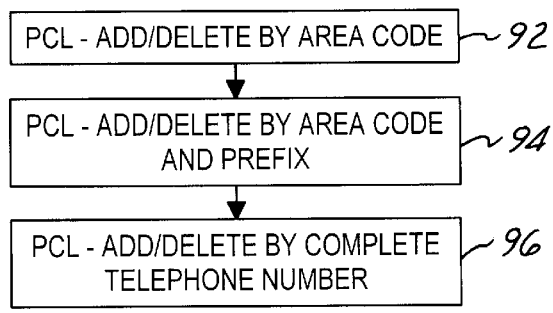
FIG. 4
FIG. 5
FIG. 6

METHOD FOR SCREENING CALLS

TECHNICAL FIELD

The present invention relates to a method for screening calls from a caller to a subscriber, and to methods for administrating services for incoming and outgoing calls.

BACKGROUND ART

An intelligent network includes a switching system, a signaling network, a centralized database, and an operations support system. When a call is placed, the switching system intercepts the call. The switching system sends a query through the signaling network to the centralized database. The database returns call handling and routing information to the switch, and the call is completed.

The intelligence of the intelligent network is found at the service control points. A service control point is a database that provides call handling and routing information in response to network queries. The signaling network is made up of signal transfer points. Signaling system 7 is a common communications protocol used in common-channel signaling networks.

An advanced intelligent network (AIN) performs the same functions as a traditional intelligent network, but is improved in that new services may be created utilizing functions offered in the network. That is, the advanced intelligent network allows people to create new services. As a result of advancements in the advanced intelligent network, new services are created rapidly to meet subscriber needs.

One problem that is faced by subscribers is the fact that many subscribers receive undesired solicitation phone calls. One existing service allows the subscriber to receive identification of the caller before the subscriber answers the incoming call. Although this solution satisfies many subscribers, there are some subscribers that desire a solution to the increasing number of soliciting phone calls that requires vary little effort on the part of the subscriber, while reducing the inconvenience of receiving such calls.

For the foregoing reasons, there is a need for a call screening method that automatically screens unwanted calls for the subscriber. Further, there is a need for generally improved administration of incoming and outgoing call services.

DISCLOSURE OF INVENTION

It is, therefore, an object of the present invention to provide an improved method for administrating incoming and/or outgoing call services.

In carrying out the above object, a method for administrating a service for incoming calls to a subscriber is provided. The method comprises intercepting an incoming call for processing, identifying a caller for the incoming call, and monitoring activities of the caller during a series of incoming calls. The method further comprises determining an automatic service for the caller based on the caller activities, and processing subsequent incoming calls from the caller in accordance with the automatic service.

In some embodiments, determining the automatic service includes placing the caller on a list of privileged callers for the subscriber when dictated by the caller activities. Processing further includes sending the call directly to the subscriber when the caller is on the list of privileged callers, and otherwise, holding the call for processing.

Further, in carrying out the present invention, a method for administrating a service for outgoing calls from a caller is provided. The method comprises monitoring activities of the caller during a series of outgoing calls, determining an automatic service for the caller based on the caller activities, and processing subsequent outgoing calls from the caller in accordance with the automatic service.

In some embodiments, determining the automatic service includes determining a suffix corresponding to a particular outgoing call occurring multiple times in the outgoing call series. Processing further includes automatically adding the suffix to subsequent occurrences of the particular outgoing call. The suffix may be, for example, typical menu selections that the caller always selects when calling a certain outgoing phone number.

Further, in the present invention, a method for screening calls from a caller to a subscriber is provided. The method comprises establishing a list of privileged callers for the subscriber, and intercepting a call from the caller that was destined for the subscriber. The method further comprises sending the call directly to the subscriber when the caller is on the list of privileged callers, otherwise, holding the call for processing.

In some embodiments, when a call is held for further processing, a menu is presented to the caller including an option for sending the call to the subscriber. Further, in some embodiments, presenting the menu further comprises requesting the caller to terminate the call when the caller is a solicitor, and to otherwise opt for sending the call to the subscriber.

In some embodiments, establishing the list further comprises establishing at least one criterion for a privileged caller, and automatically adding a new caller to the list of privileged callers when the new caller meets the at least one criterion. Further, a caller may be automatically deleted from the privileged caller list when the caller fails to meet the at least one criterion, after previously meeting the at least one criterion and being on the list. In one implementation, establishing the at least one criterion further comprises determining a call limit and determining a time limit. The criterion is determined as making a number of calls to the subscriber that exceeds the call limit within a time that is within the time limit, with those calls having been sent to the subscriber withstanding the call processing. That is, a caller that repeatedly receives the menu and opts to send the call to the subscriber will eventually be placed on the privileged caller list.

In some embodiments, intercepting the call further comprises determining a screening system status, and intercepting the call when the system status is on. When the system status is off, the call is sent to the subscriber, without referring to the privileged caller list. In one implementation, determining the screening system status further comprises establishing a default operating period and detecting a manual override condition. The screening system status is determined as on during the default operating period and as off outside of the default operating period, unless dictated differently by a manual override condition.

Further, in carrying out the present invention, a method for screening calls from a caller to a subscriber is provided. The method comprises establishing at least one privileged caller criterion for the subscriber, and intercepting a call from the caller when the call was destined for the subscriber. The method further comprises sending the call directly to the subscriber when the caller meets the at least one privileged caller criterion, otherwise, holding the call for processing.

In some embodiments, establishing the at least one privileged caller criterion further comprises establishing a list of privileged callers. The caller meets the at least one privileged caller criterion when the caller is on the privileged caller list. Further, in some embodiments, the privileged caller list is based at least in part on information provided by the subscriber. A caller may be designated as a privileged caller based on an area code for the caller. Further, a caller may be designated as a privileged caller based on an area code and a prefix for the caller. Still further, in some embodiments, a caller may be designated as a privileged caller based on a telephone number for the caller. That is, a subscriber may build the privileged caller list including privileged area codes, privileged prefixes, and privileged telephone numbers.

Still further, in carrying out the present invention, a method for screening calls from a caller to a subscriber is provided. The method comprises generating a list of privileged callers for the subscriber. The list is based in part on information provided by the subscriber and in part on at least one automatic privileged caller criterion. The information provided by the subscriber overrides the at least one criterion. That is, the privileged caller list is automatically generated based on repeated callers that opt to have the call sent to the subscriber. However, information provided by the subscriber (area codes, prefixes, telephone numbers, etc.) overrides the automatically generated list. The method further comprises intercepting a call from the caller, and sending the call directly to the subscriber when the caller is on the list of privileged callers. Otherwise, the call is held for further processing.

The advantages associated with embodiments of the present invention are numerous. For example, in the call screening embodiments, some people strongly dislike being confronted by telemarketers and other solicitors, but do not want to inconvenience family or friends. Such people may utilize a privileged caller list in accordance with the present invention to allow privileged callers to reach the subscriber without delay, while sending other callers to the menu. The menu could instruct a non-privileged caller to press the number "1" to reach the subscriber, and to hang up if the caller is a solicitor because the subscriber is covered by a no solicitation service that screens all calls to the subscriber. Further, although some embodiments of the present invention may utilize simply a manual privileged caller list, other embodiments may use additional functionality of the advanced intelligent network to build privileged caller lists for the subscriber. Further, the network provider also benefits by avoiding trunking and other costs associated with playing announcements and collecting digits on calls that should not have to be offered this option.

Further, it is appreciated that embodiments of the present invention are not limited to call screening embodiments. That is, embodiments of the present invention provide methods for administrating a service for incoming and/or outgoing calls. In the service administration embodiments, it is appreciated that the ability of the system to learn or to determine the automatic service, is of great benefit. For example, in an outgoing call service example, if the caller always adds a particular code as a suffix when dialing a specific number, the system should eventually always add it when that specific number is dialed. In another outgoing call example, the system could detect frequently called numbers and add them to a speed dial list. That is, embodiments of the present invention may be suitable for a number of different incoming and outgoing call services, and screening of incoming calls is a preferred embodiment, but is also an exemplary embodiment and is not meant to limit the available alternatives for implementing administration services in accordance with the present invention.

The above object and other objects, features, and advantages of the present invention are readily apparent from the following detailed description of the best mode for carrying out the invention when taken in connection with the accompanying drawings.

BRIEF DESCRIPTION OF DRAWINGS

FIG. 4 is a block diagram illustrating another way to generate the privileged caller list;

FIG. 5 is a block diagram illustrating a method of the present invention; and

FIG. 6 is a block diagram illustrating another way to implement the privileged caller list.

BEST MODE FOR CARRYING OUT THE INVENTION

Figure 1:
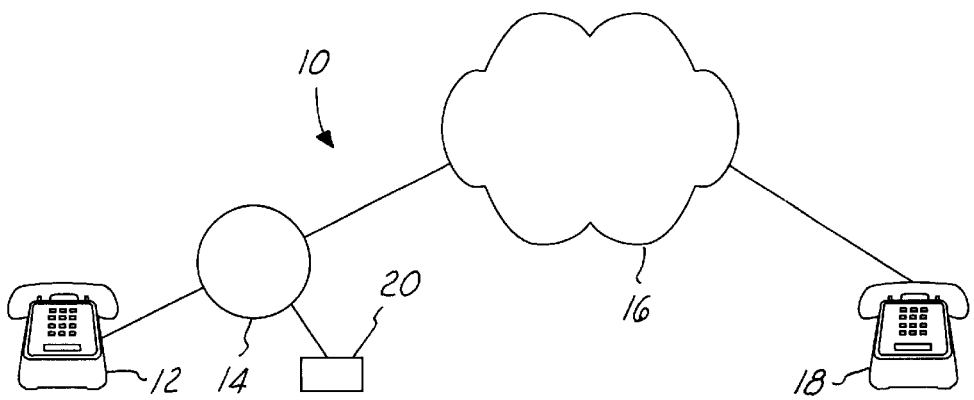
FIG. 1 illustrates a network architecture employing control logic in accordance with the present invention to provide call screening.

With reference to FIG. 1, a networking environment is generally indicated at 10. A subscriber 12 is connected to a local switch 14. Switch 14 connects subscriber 12 with network 16. A caller 18 may place a call to subscriber 12 in which the call is communicated over network 16, through switch 14, to subscriber 12. Of course, it is appreciated by those skilled in the art that networking environment 10 may be a wireline network, a wireless network, or a combination of wireline and wireless networks, and that embodiments of the present invention are not limited to any particular network architecture. Control logic 20 communicates with switch 14 and is configured (in the exemplary embodiment) to screen calls for subscriber 12. Of course, although control logic 20 is shown in communication with local switch 14, the control logic may be located elsewhere in the network as understood by those skilled in the art of intelligent networks and advanced intelligent networks. That is, embodiments of the present invention may be implemented as a service in an advanced intelligent network (AIN) by any technique known for adding services in an AIN environment.

In the embodiment illustrated in FIG. 1, control logic 20 establishes a privileged caller list (PCL), and intercepts calls destined for subscriber 12 at local switch 14. When the caller is on the privileged subscriber list, the call is sent directly to subscriber 12. Otherwise, when caller 18 is not a privileged caller on the list, the call is held for further processing which may take a variety of forms. Of course, embodiments of the present invention are suitable for administrating a number of different call services, as mentioned previously.

Figure 2:
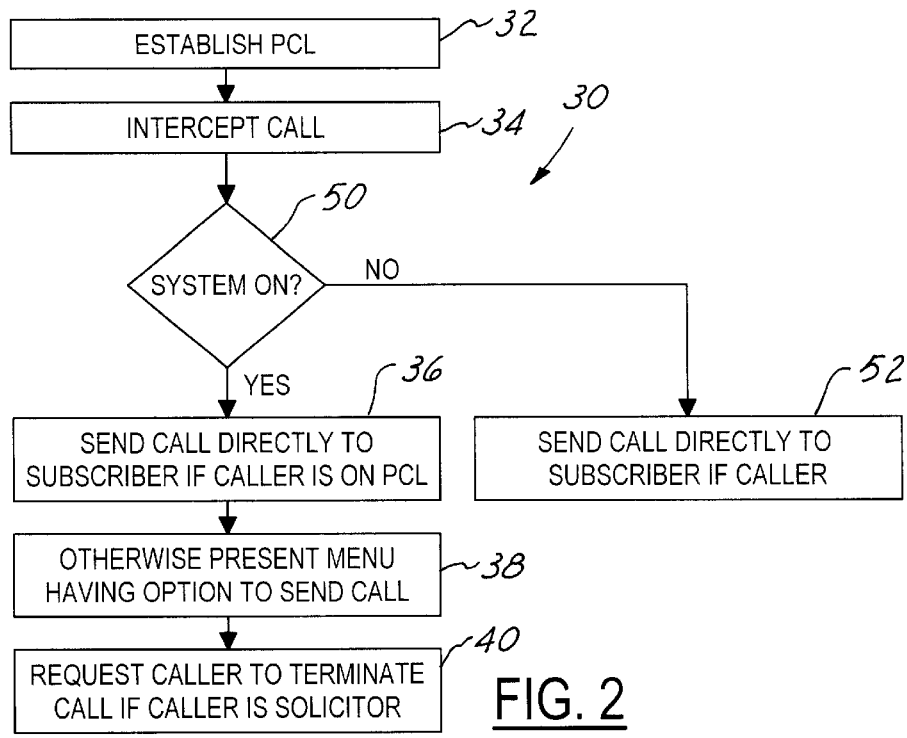
FIG. 2 is a block diagram illustrating a method of the present invention.

With reference to FIG. 2, a method of the present invention in a call screening embodiment is generally indicated at 30. At block 32, a privileged caller list is established. Of course, in accordance with the present invention, the privileged caller list may be established automatically by network intelligence or may be manually established by the subscriber. Preferably, the privileged caller list is established automatically by the network intelligence, but manual additions and deletions to and from the list should take precedence over the automatic list generation. At block 34, a call is intercepted. As illustrated in FIG. 1, the call may be intercepted by control logic at the local switch. On the other hand, the network intelligence may be implemented, in accordance with advanced intelligent network (AIN) techniques such that the call is intercepted elsewhere in the network other than at the local switch to the subscriber. For example, the call could be intercepted at the local switch or central office of the caller.

If the system or service (system, service, and similar terms are used interchangeably herein) is on (decision block 50), flow proceeds to block 36. At block 36, if the caller is on the privileged caller list, the call is sent directly to the subscriber. Otherwise, in preferred embodiments, the caller is presented with a menu (block 38) giving the option to send the call. Some embodiments (block 40) present the menu and request that the caller hang up if the caller is an unwanted solicitor, and otherwise, give the caller the option to press the "1" key to have the call routed to the subscriber. When the system is off (decision block 50), flow proceeds to block 52 with the call being sent directly to the subscriber.

In a preferred embodiment of the present invention, the system control logic automatically builds a privileged caller list containing the telephone numbers of frequent callers who have pressed the "1" key to access the subscriber. The list is automatically updated with the most recent frequent callers. The subscriber may manually update/change the privileged caller list. The subscriber further, preferably, has the option to turn off/on the automatic feature. In the exemplary implementation, there are two bypass features built into the service. A caller may bypass the menu by pressing the "1" key, that is, opt for the call to be sent to the subscriber. Further, a caller that is on the privileged caller list would be sent directly to the subscriber's telephone number, completely bypassing the service. Preferably, an access code is needed for the subscriber to access the service for adding and deleting entries in the privileged caller list.

Of course, it is appreciated that the exemplary implementation described above, and further described below, is merely one way to implement the present invention. That is, those skilled in the art appreciate that a privileged caller list of the present invention may be implemented in a variety of ways and that the examples set forth herein are suitable implementations for use in an advanced intelligent network (AIN) environment. Further, the present invention is not limited to call screening, but extends to the administration of other incoming and outgoing call services.

Figure 3:
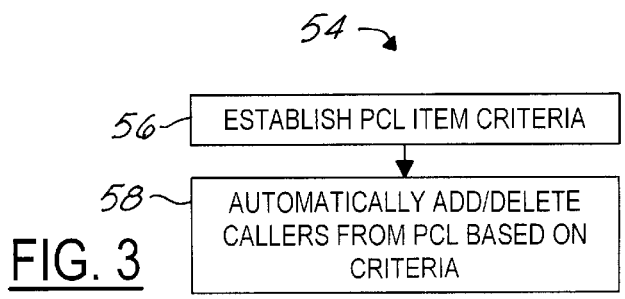
FIG. 3 is a block diagram illustrating a way to generate the privileged caller list.

With reference to FIG. 3, a block diagram illustrates one suitable way to establish the privileged caller list, at 54. At block 56, at least one criterion for a privileged caller is established. At block 58, a privileged caller list is formed based on the at least one criterion. That is, when a caller meets the at least one criterion, that caller is added to the list. When a caller no longer meets the at least one criterion, that caller (may be) automatically removed from the privileged caller list. Presently, the inventors prefer to allow automatic addition of callers, but not to allow automatic deletion of callers.

One way to implement privileged caller list item criteria is shown in FIG. 4. A block diagram, generally indicated at 60, illustrates one suitable way to determine when to add a caller to the privileged caller list. At block 62, a call limit is determined. At block 64, a time limit is determined. At block 66, a caller is added to the privileged caller list when calls exceed the call limit within the time limit. That is, for example, the call limit could be five calls, with the time limit being seven days. A caller is then added to the privileged caller list after making five calls to the subscriber within seven days. Optionally, it could be required that in each of the five calls, the caller had opted for the call to be routed to the subscriber so that repeated calls and hang ups from an unwanted caller do not result in an unwanted caller being placed on the privileged caller list.

In one suitable implementation for the present invention, a subscriber can create the privileged caller list manually or let the service create it automatically. Calls to the subscriber from numbers on the subscriber's privileged caller list will be sent directly to the subscriber's number and will not encounter the menu announcement (or other type of processing). The menu or other processing eliminates the annoyance that might occur for the subscriber's privileged callers. Calls to the subscriber from numbers (or names, or other types of identifiers) not on the subscriber's privileged caller list may be added to the privileged caller list automatically if the calling party is a frequent caller. For example, a frequent caller may be determined as a caller that calls a number of times that exceeds a call limit within a duration established as a time limit (for example, five calls withing seven days).

Of course, it is preferred that the service does not impact outgoing calls and that the subscriber may make outgoing calls whether the service is on or off. In one alternative, the privileged caller list could be affected by outgoing calls. For example, if a subscriber makes a certain number of outgoing calls in a limited time to the same call destination, the call destination for those outgoing calls could be added as a privileged caller to the privileged caller list. This is making the assumption that the caller would be willing to accept calls from someone that the caller often calls. As such, automatic changes to the privileged caller list based on outgoing calls should have the option of being turned off.

In some embodiments, the screening system may be turned on or off. As such, calls are intercepted by the system (and directly sent or further processed, as appropriate), when the system status is on. Otherwise, when the system status is off, calls are sent directly to the subscriber, without referring to the privileged caller list. For example, in one suitable implementation, the screening system is automatically on between 8:00 a.m. and 9:00 p.m. Of course, the subscriber is preferably given the option to manually override the default system status (on or off) and to set his or her own system operation times. That is, when the service is off, all incoming calls will be sent to the subscriber's telephone number for normal call processing. If the subscriber's telephone is not in use, the subscriber's's telephone will ring and the caller will hear the audible ringing.

In one suitable implementation, when the service is on, callers will hear the menu announcement. Callers could hear a standard message, such as: "You have reached a number that does not accept solicitations. If you are a solicitor, please add this number to your do-not-call list and hang up now. Otherwise, please press '1' or stay on the line." If the number "1" is pressed or the caller stays on the line, the call will be sent to the subscriber's telephone number for normal call handling. If the caller presses "0", the message will be replayed. If any other digit is pressed, the caller will informed that the digit that was entered is not an option and to please try again. The caller is given three attempts, in one suitable implementation, to enter the correct digit or to wait for the service to send the call to the subscriber's number for normal call handing. If the caller is a solicitor and hangs up, the service terminates the call. Of course, additional options may be presented, as appropriate, such as an option to leave a voice mail message. Further, when a variety if different criteria are examined to determine a privileged caller, various different sets of options may be presented to the caller depending on the particular subset of criteria that is met.

Of course, it is appreciated, that the privileged caller list (PCL) items may take many forms. For example, an item on the list may be a particular telephone number. Further, for example, an item on the privileged caller list may be an area code, meaning all telephone numbers within the area code are privileged callers. On the other hand, the item on the list may be an area code and prefix, meaning that all telephone numbers having the particular area code and prefix listed are consider privileged callers. Still further, the service could possibly be configured to interact with other name services such that items on the privileged caller list may include caller names in addition to telephone number variations. As best shown in FIG. 6, adding and deleting PCL items by area code (block 92), by area code and prefix (block 94), and by complete telephone number (block 96), are shown in the block diagram generally indicated at 90.

Embodiments of the present invention may provide automatic privileged caller list generation, manual list generation, or a combinational approach that provides some automatic generation along with manual customer list item creation that overrides any automatically created list items. In one suitable implementation, subscribers can manually customize and update their service profiles by dialing an access code (such as an asterisk or "star" code) and interacting with a voice responsive menu using the dual tone multiple frequency (DTMF) keys to make changes to the subscriber's profile. Once a subscriber has successfully accessed service, the subscriber is provided with menu options allowing the subscriber to change the subscriber's profile. In one implementation, the menu provides the capability to: activate or deactivate the service, hear the numbers on the privileged caller list, or add or remove numbers on the privileged caller list.

In a suitable implementation, the DTMF update session allows the subscriber up to three chances to enter the requested data for each prompt in the DTMF menu. If an inaccurate entry has been detected, the subscriber will be given an error message and re-prompted for the data. If an incorrect entry is detected after two re-prompts, the subscriber will hear a final announcement and the call will be disconnected. This is to ensure system security and to avoid excessive utilization of the systems resources. Further, time outs or extended periods of time where there is no subscriber input are considered an incorrect entry. Of course, the implementation described immediately above is one suitable embodiment, and there are many others.

With reference to FIG. 5, a block diagram generally indicated at 70 illustrates another method of the present invention. At block 72, a system status is determined. At block 74, calls are intercepted for processing when the system status is on. At block 76, a call is sent directly to the subscriber when the system is off. At blocks 78, 80, 82, system default operating hours are established, and the system is on during default operating hours, absent a manual override.

Of course, although the specific exemplary embodiment described in detail above is a call screening system for incoming calls, it is appreciated that embodiments of the present invention may be suitable for other applications. For example, a method for administrating a service for incoming calls, in accordance with the present invention, monitors caller activities and determines an automatic service. Subsequent processing of incoming calls from the caller is performed in accordance with the automatic service. Similarly, embodiments of the present invention may be implemented for administrating a service for outgoing calls. Outgoing call administration services monitor caller activity, and determine an automatic service for use when processing subsequent outgoing calls. It is believed that a privileged caller list is one example of an implementation of the present invention. As such, it is contemplated that other incoming and outgoing call administration services are possible.

While embodiments of the invention have been illustrated and described, it is not intended that these embodiments illustrate and describe all possible forms of the invention. Rather, the words used in the specification are words of description rather than limitation, and it is understood that various changes may be made without departing from the spirit and scope of the invention.

What is claimed is:

1. A method for administrating a service for incoming calls, to a subscriber, the method comprising:

intercepting an incoming call for processing;

identifying a caller for the incoming call;

monitoring activities of the caller during a series of incoming calls;

determining an automatic service for the caller based on the caller activities; and processing subsequent incoming calls from the caller in accordance with the automatic service.

2. The method of claim 1 wherein determining the automatic service includes placing the caller on a list of privileged callers for the subscriber when dictated by the caller activities, and processing includes sending the call directly to the subscriber when the caller is on the list of privileged callers, otherwise, holding the call for processing.

3. A method for administrating a service for outgoing calls from a caller, the method comprising:

monitoring activities of the caller during a series of outgoing calls;

determining an automatic service for the caller based on the caller activities; and processing subsequent outgoing calls from the caller in accordance with the automatic service.

4. The method of claim 3 wherein determining the automatic service includes determining a suffix corresponding to a particular outgoing call occurring multiple times in the outgoing call series, and processing includes automatically adding the suffix to subsequent occurrences of the particular outgoing call.

5. A method for screening calls from a caller to a subscriber, the method comprising:

establishing a list of privileged callers for the subscriber based on caller identity;

intercepting a call from the caller, the call being destined for the subscriber;

automatically identifying the privileged status of the caller as determined by the caller's identification in accordance with the list of privileged callers; and sending the call directly to the subscriber when the caller is on the list of privileged callers, otherwise, holding the call for processing.

6. The method of claim 5 further comprising:

when a call is held for further processing, presenting a menu including an option for sending the call to the subscriber.

7. The method of claim 6 wherein presenting the menu further comprises:

requesting the caller to terminate the call when the caller is a solicitor, and to otherwise opt for sending the call to the subscriber.

8. The method of claim 5 wherein establishing the list further comprises:

establishing at least one criterion for a privileged caller; and automatically adding a new caller to the list of privileged callers when the new caller meets the at least one criterion.

9. The method of claim 8 wherein an old caller is on the list of privileged callers, and wherein the method further comprises:

automatically deleting the old caller from the list of privileged callers when the old caller fails to meet the at least one criterion.

10. The method of claim 8 wherein establishing the at least one criterion further comprises:

determining a call limit;

determining a time limit; and determining a criterion as making a number of calls to the subscriber that exceeds the call limit within a time that is within the time limit, the number of calls to the subscriber being sent to the subscriber withstanding the call processing.

11. The method of claim 5 wherein intercepting the call further comprises:

determining a screening system status;

intercepting the call when the system status is on; and sending the call to the subscriber, without referring to the privileged caller list, when the system status is off.

12. The method of claim 11 wherein determining the screening system status further comprises:

establishing a default operating period;

detecting a manual override condition; and determining the screening system status as on during the default operating period and as off outside of the default operating period, unless dictated differently by a manual override condition.

13. A method for screening calls from a caller to a subscriber, the method comprising:

establishing at least one privileged caller criterion for the subscriber based on caller identity;

intercepting a call from the caller, the call being destined for the subscriber;

automatically identifying the privileged status of the caller as determined by the caller's identification in accordance with the at least one privileged caller criterion; and sending the call directly to the subscriber when the caller meets the at least one privileged caller criterion, otherwise, holding the call for processing.

14. The method of claim 13 wherein establishing the at least one privileged caller criterion further comprises:

establishing a list of privileged callers, wherein the caller meets the at least one privileged caller criterion when the caller is on the privileged caller list.

15. The method of claim 14 wherein the list is based at least in part on information provided by the subscriber, and wherein establishing the list further comprises:

designating a caller as a privileged caller, based on an area code for the caller, and further based on the information provided by the subscriber.

16. The method of claim 14 wherein the list is based at least in part on information provided by the subscriber, and wherein establishing the list further comprises:

designating a caller as a privileged caller, based on an area code and a prefix for the caller, and further based on the information provided by the subscriber.

17. The method of claim 14 wherein the list is based at least in part on information provided by the subscriber, and wherein establishing the list further comprises:

designating a caller as a privileged caller, based on a telephone number for the caller, and further based on the information provided by the subscriber.

18. A method for screening calls from a caller to a subscriber, the method comprising:

generating a list of privileged callers for the subscriber, the list being based in part on information provided by the subscriber and in part on at least one automatic privileged caller criterion, wherein the information provided by the subscriber overrides the at least one criterion;

intercepting a call from the caller, the call being destined for the subscriber; and sending the call directly to the subscriber when the caller is on the list of privileged callers, otherwise, holding the call for processing.

* * * * *